(12) United States Patent
Georgeson

(10) Patent No.: US 11,275,391 B2
(45) Date of Patent: Mar. 15, 2022

(54) IN-SERVICE MAINTENANCE PROCESS USING UNMANNED AERIAL VEHICLES

(71) Applicant: The Boeing Company, Chicago, IL (US)

(72) Inventor: Gary E. Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 328 days.

(21) Appl. No.: 16/410,085

(22) Filed: May 13, 2019

(65) Prior Publication Data
US 2020/0363822 A1    Nov. 19, 2020

(51) Int. Cl.
*G05D 1/10*        (2006.01)
*B23P 6/00*        (2006.01)
(Continued)

(52) U.S. Cl.
CPC .............. *G05D 1/104* (2013.01); *B23P 6/00* (2013.01); *B64C 39/024* (2013.01); *B64D 47/08* (2013.01);
(Continued)

(58) Field of Classification Search
CPC .... G05D 1/104; G05D 1/0011; G05D 1/0094; B64F 5/60; B64F 5/40; B64C 2201/027;
(Continued)

(56) References Cited

U.S. PATENT DOCUMENTS 4,413,905 A    11/1983    Holzapfel
5,135,356 A    8/1992    Shepherd
(Continued)

FOREIGN PATENT DOCUMENTS

EP        3173338 A1    5/2017
ES        2614994 A1    6/2017
(Continued)

OTHER PUBLICATIONS

Extended European Search Report dated Sep. 15, 2020 in European Application No. 20163950.7 (European counterpart to the instant U.S. patent application).
(Continued)

*Primary Examiner* — Frederick M Brushaber
(74) *Attorney, Agent, or Firm* — Ostrager Chong Flaherty & Broitman P.C.

(57) ABSTRACT

Methods for performing repair operations using one or more unmanned aerial vehicles (UAVs). First, an unmanned aerial vehicle equipped with a camera is flown to a position in a vicinity of an area of interest on a surface of a structure. Image data representing one or more images of the structure in the area is acquired using the camera. Second, an unmanned aerial vehicle equipped with a non-destructive examination (NDE) sensor unit is flown until the NDE sensor unit is within measurement range of the structure in the area of interest. Then NDE sensor data representing structural characteristics of the structure in the area of interest is acquired. Third, an unmanned aerial vehicle equipped with a repair tool is moved to a location that places the repair tool in contact with the surface in the area of interest. Then the structure in the area is repaired using the repair tool. Once the repair has been completed, a UAV equipped with a camera or an NDE sensor unit may be used to determine whether the repaired structure should be placed back in service or not.

20 Claims, 11 Drawing Sheets

(51) Int. Cl.
| | |
|---|---|
| *B64C 39/02* | (2006.01) |
| *B64D 47/08* | (2006.01) |
| *G05D 1/00* | (2006.01) |
| *B64F 5/40* | (2017.01) |
| *B64F 5/60* | (2017.01) |
| *G01M 5/00* | (2006.01) |
| *G06Q 10/06* | (2012.01) |
| *G06Q 10/00* | (2012.01) |
| *G06T 7/136* | (2017.01) |
| *G06T 7/62* | (2017.01) |

(52) U.S. Cl.
CPC .......... *G05D 1/0011* (2013.01); *G05D 1/0094* (2013.01); *B64C 2201/12* (2013.01); *B64C 2201/146* (2013.01)

(58) Field of Classification Search
CPC ........ B64C 2201/108; B64C 2201/126; B64C 2201/127; B64C 2201/146; B64C 39/024; B64C 2201/12; G06T 7/0002; G06T 7/0004; G06T 7/136; G06T 7/62; G06T 2207/20104; G01N 25/72; B23P 6/00; B64D 47/08; G01M 5/0016; G01M 5/0033; G01M 5/0091; G06Q 10/06311; G06Q 10/20
See application file for complete search history.

(56) References Cited

U.S. PATENT DOCUMENTS

| | | | |
|---|---|---|---|
| 5,904,165 A | 5/1999 | McLean et al. | |
| 7,398,698 B2 | 7/2008 | Griess et al. | |
| 7,617,730 B2 | 11/2009 | Georgeson et al. | |
| 7,643,893 B2 | 1/2010 | Troy et al. | |
| 7,813,888 B2 | 10/2010 | Vian et al. | |
| 7,859,655 B2 | 12/2010 | Troy et al. | |
| 8,044,991 B2 | 10/2011 | Lea et al. | |
| 8,060,270 B2 | 11/2011 | Vian et al. | |
| 8,214,098 B2 | 7/2012 | Murray et al. | |
| 8,255,170 B2 | 8/2012 | Kollgaard et al. | |
| 8,691,383 B2 | 4/2014 | Georgeson et al. | |
| 8,738,226 B2 | 5/2014 | Troy et al. | |
| 8,744,133 B1 | 6/2014 | Troy et al. | |
| 9,156,321 B2 | 10/2015 | Troy et al. | |
| 9,221,506 B1 | 12/2015 | Georgeson et al. | |
| 9,285,296 B2 | 3/2016 | Georgeson et al. | |
| 9,371,133 B2 | 6/2016 | Mays | |
| 9,513,635 B1 | 12/2016 | Bethke et al. | |
| 9,731,818 B2 | 8/2017 | Dekel et al. | |
| 9,840,339 B1 | 12/2017 | O'Brien et al. | |
| 10,186,348 B2 | 1/2019 | Davis et al. | |
| 2010/0268409 A1 | 10/2010 | Vian et al. | |
| 2012/0136630 A1 | 5/2012 | Murphy et al. | |
| 2012/0262708 A1 | 10/2012 | Connolly | |
| 2014/0316614 A1* | 10/2014 | Newman | B64C 39/024 701/3 |
| 2015/0063903 A1* | 3/2015 | Matthews | B23P 6/04 403/267 |
| 2016/0039054 A1* | 2/2016 | Ghasripoor | B23P 6/00 92/172 |
| 2016/0121438 A1* | 5/2016 | Ladewig | F01D 5/005 29/402.11 |
| 2016/0377424 A1 | 12/2016 | Clark | |
| 2017/0227470 A1* | 8/2017 | Cesarano | G05D 1/0088 |
| 2017/0366980 A1 | 12/2017 | Priest et al. | |
| 2018/0022453 A1* | 1/2018 | Tian | B64D 47/08 244/17.23 |
| 2018/0072414 A1* | 3/2018 | Cantrell | B64C 33/02 |
| 2018/0074499 A1* | 3/2018 | Cantrell | G05D 1/0088 |
| 2018/0074518 A1* | 3/2018 | Cantrell | G05D 1/102 |
| 2018/0120196 A1 | 5/2018 | Georgeson et al. | |
| 2018/0191118 A1* | 7/2018 | Herron | B64C 27/08 |
| 2019/0061930 A1* | 2/2019 | Hampton | B64C 3/22 |
| 2019/0094149 A1 | 3/2019 | Troy et al. | |
| 2019/0185186 A1* | 6/2019 | Li | B64F 5/60 |

FOREIGN PATENT DOCUMENTS

| | | |
|---|---|---|
| FR | 3036381 A1 | 11/2016 |
| WO | 2019050401 A1 | 3/2019 |

OTHER PUBLICATIONS

Nikolic et al., "A UAV System for Inspection of Industrial Facilities," Aerospace Conference, 2013 IEEE, Mar. 2-9, 2013.

* cited by examiner

IN-SERVICE MAINTENANCE PROCESS USING UNMANNED AERIAL VEHICLES

BACKGROUND

This disclosure generally relates to non-destructive inspection and repair of structures. In particular, this disclosure relates to the use of unmanned aerial vehicles (UAVs) for non-destructive inspection and repair of limited-access structures.

In-person human-based inspections of large structures and various types of large objects can be time consuming, expensive and difficult for an individual to perform. Examples of large structures that pose significant inspection challenges include such as wind turbine blades, aircraft fuselages and wings, storage tanks, bridges, dams, levees, power plants, power lines or electrical power grids, water treatment facilities; oil refineries, chemical processing plants, high-rise buildings, and infrastructure associated with electric trains and monorail support structures. Such structures are routinely inspected to determine the health of the structure and to identify any issues that may require further inspection, maintenance or repair.

More specifically, materials and structures employed in the aerospace industry and elsewhere may periodically require repair for in-service damage. Rapid inspection and repair of aircraft are important for military and commercial applications in order to decrease down time. For example, the use of composite structures is increasingly common on commercial aircraft. Composites may be damaged in the course of service. Examples of such in-service damage include impact damage due to hail, runway debris (object damage), or collisions with ground support vehicles.

For example, objects commonly impact vehicles while in motion. The problem of impact of objects upon aircraft is particularly significant. Objects impacting aircraft during flight include hail, sleet and birds. Additionally, parts, rocks and gravel on a taxiway or runway may also strike an aircraft while on the ground. When an impact of an object upon an aircraft is suspected by a flight crew, there may be mandatory reporting requirements that require a visual inspection of the aircraft upon landing.

In instances in which the inspection of a structure determines that the structure should undergo repair, such as to address a structural anomaly identified during the inspection, the repairs are desirably performed in a timely manner such that the structure may be promptly returned to service. For example, damage may be discovered at the airport loading gate just prior to a departure. If repair equipment is not available or if the repair may be extensive, the flight might be cancelled. The aircraft may be grounded and taken out of service to be ferried or towed to a maintenance base, with consequent significant economic impact to the aircraft operator.

A repair may be provided that would be temporary or permanent depending on the extent of the damage. These may be non-structural (such as sealing the surface so moisture does not get in) or structural (restoring some level of strength to the area). If the damage is superficial, the aircraft may be simply released for departure without a repair. The extent of the damage may need to be determined even as passengers are waiting at the boarding gate, expecting to depart. Without knowledge of the extent of damage, one cannot determine what level of repair, if any, is needed.

There is a need for rapid return to service of large composite structures (e.g., aircraft and wind turbine blades) during planned structural maintenance checks, or after an event that may have created damage (e.g., lightning strike, physical impact, bird strike).

SUMMARY

The subject matter disclosed in some detail below is directed to methods for performing inspection and repair operations using unmanned aerial vehicles (UAVs). The methods are enabled by equipping one or more UAV with respective tools for rapidly performing a process involving structural assessment and repair of a large structure or object (e.g., an aircraft or a wind turbine blade) that is not easily accessible to maintenance personnel. In accordance with some embodiments, the process includes multiple UAVs respectively configured to perform visual detection, non-destructive evaluation (NDE), and repair in a manner that enables a large structure, such as an aircraft or a wind turbine, to be returned to service quickly after an impact incident or discovery of potential damage. (As used herein, "NDE" does not include and "visual inspection" does include visualization of a surface using light in the visible spectrum reflected from the surface.) In alternative embodiments, a single UAV may be configured to perform the aforementioned functions and additional thresholding functions.

The repair plan disclosed herein adopts an integrated approach that utilizes UAV technology for full rapid structural maintenance activity when re-insertion into service is a priority. Visual inspection is done remotely with a camera-equipped UAV, using a controlled process to ensure confidence in the result. Visual data is tied to the structural model for localization and disposition assessment relative to nearby structure. The image data acquired by the camera is automatically assessed (on-board the UAV) relative to a specified damage threshold (using image analysis-based dimensional or area measurement comparison to damage criteria), with an option for on-ground analysis of downloaded results, if results are non-standard or otherwise of interest.

By comparing an aspect (e.g., a value of a parameter) of the image data to the specified damage threshold, a determination is made whether the visual evidence indicates damage in an area of interest above a first "use as is" threshold. If the threshold is exceeded, a UAV-enabled NDE is performed. The UAV is configured to place the NDE sensor unit in contact with or within a measurement range of to a surface of a structure being inspected. As used herein, the term "measurement range" means the distance within which a sensor is able to receive a measurable signal representing a characteristic of a structure. If NDE is called for, the same UAV that performed the visual inspection or a separate UAV extends or temporarily leaves an NDE sensor unit on the surface and overlying the potential damage area. The NDE sensor unit scan or sensor location is determined by processing the camera image acquired while a location tag (on the structure's surface) was in the camera field-of-view. The NDE sensor unit collects the data over the relevant area and that information is assessed automatically (on-board the UAV) for "use-as-is", fuller NDE needed, UAV-enabled repair, or manual repair. The result of the UAV-enabled NDE may optionally be fed into a finite element analysis to determine repair type, size and shape.

By comparing an aspect (e.g., a value of a parameter) of the sensor data to specified damage thresholds, a determination is made whether the NDE sensor unit data indicates damage in the area that is both greater than a second "use as is" threshold and less than a "remote repair" threshold. If the NDE confirms that the damage is within the range bounded by those thresholds, a determination is made that a repair should be performed. If the UAV that performed the NDE is not adequately equipped to perform the repair, a UAV equipped with the appropriate repair tools is dispatched to the repair site. While the UAV is stationary, a repair tool is activated to perform a repair operation on the structure. Once the repair has been completed, a UAV equipped with a camera or an NDE sensor unit may be used to assess the state of the repaired structure. Depending on the result of the assessment, a determination is made whether to place the structure back in service or not.

The overall process described in the preceding three paragraphs seeks to minimize the number of steps used (saving time and effort), with the number of steps depending upon the result of the visual and NDE data sets. This process may have manifold benefits. The complete structural assessment process using UAVs proposed herein enables significant cost, time and labor savings as well improving safety. The process enables very rapid and potentially complete disposition of potential damage on large composite structures. The process further allows rapid return of vehicles or structures to service, thereby avoiding extended downtime. The process further allows users such as wind turbine owners to do damage detection, NDE and repair of their structures without any direct access to the damage locations. All data collected can be used for assessments, tracking and trending.

Although various embodiments of methods for inspecting and repairing a damaged portion of a large structure or object using one or more UAVs are described in some detail later herein, one or more of those embodiments may be characterized by one or more of the following aspects.

One aspect of the subject matter disclosed in detail below is a method for inspecting and repairing a structure using one or more unmanned aerial vehicles, comprising the following steps: (a) flying an unmanned aerial vehicle equipped with a camera to a position in a vicinity of an area on a surface of a structure; (b) acquiring image data representing one or more images of the structure in the area using the camera; (c) flying an unmanned aerial vehicle equipped with an NDE sensor unit until the NDE sensor unit is within measurement range of the structure in the area; (d) acquiring sensor data representing structural characteristics of the structure in the area using the NDE sensor unit while the NDE sensor unit is within measurement range of the structure in the area; (e) moving an unmanned aerial vehicle equipped with a repair tool to a location that places the repair tool in contact with the surface in the area; and (f) repairing the structure in the area using the repair tool while the unmanned aerial vehicle equipped with the repair tool is at the location. In accordance with some embodiments, the method further comprises: determining that the image data acquired in step (b) indicates damage in the area above a first "use as is" threshold before proceeding to step (c); determining that the sensor data acquired in step (d) indicates damage in the area above a second "use as is" threshold before proceeding to step (f); and determining that the sensor data acquired in step (d) indicates damage in the area below a "remote repair" threshold before proceeding to step (f).

In one proposed implementation of the method described in the immediately preceding paragraph, the structure is an aircraft and the method further comprises: (g) receiving a report at an aircraft maintenance operations center that an object has impacted the aircraft; and (h) determining the current position on the ground of the aircraft, wherein steps (g) and (h) are performed prior to step (a).

Another aspect of the subject matter disclosed in detail below is a method for inspecting and repairing a structure using an unmanned aerial vehicle equipped with a camera, an NDE sensor unit and a repair tool. The method comprises the following steps: (a) flying the unmanned aerial vehicle to a location in a vicinity of an area on a surface of a structure; (b) acquiring image data representing one or more images of the surface in the area using the camera while the unmanned aerial vehicle hovers at the location; (c) flying the unmanned aerial vehicle until the NDE sensor unit is within measurement range of the structure in the area; (d) acquiring sensor data representing structural characteristics of the structure in the area using the NDE sensor unit while the NDE sensor unit is within measurement range of the structure in the area; (e) moving the unmanned aerial vehicle until the repair tool is in contact with the surface in the area; and (f) repairing the structure in the area using the repair tool.

A further aspect of the subject matter disclosed in detail below is an unmanned aerial vehicle comprising: a frame; a plurality of rotor motors mounted to the frame; a plurality of rotors operatively coupled to respective rotor motors of the plurality of rotor motors; a camera supported by and rotatable relative to the frame; an NDE sensor unit supported by the frame; a repair tool supported by the frame; and a computer system configured to execute the following operations: determine whether NDE sensor data acquired by the NDE sensor has a value greater than a first "use as is" threshold and less than a "remote repair threshold or not; and activate the repair tool in response to a determination that the NDE sensor data has a value greater than the first "use as is" threshold and less than the "remote repair threshold. In some embodiments, the computer system is further configured to: determine whether image data acquired by the camera has a value greater than a second "use as is" threshold or not; and activate the NDE sensor unit in response to a determination that the image data has a value greater than the second "use as is" threshold.

In one proposed implementation, the unmanned aerial vehicle described in the immediately preceding paragraph further comprises: a camera turret motor mounted to the frame; and a camera turret rotatably coupled to the frame, operatively coupled to the camera turret motor and supporting the camera. The camera turret is rotatable between a first angular position and a second angular position. The NDE sensor unit is in a field-of-view of the camera when the camera turret is in the first angular position and is not in the field-of-view of the camera when the camera turret is in the second angular position. The repair tool is in the field-of-view of the camera when the camera turret is in the second angular position and is not in the field-of-view of the camera when the camera turret is in the first angular position.

Other aspects of methods for inspecting and repairing a damaged portion of a large structure or object using one or more UAVs are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

Figure 1A:
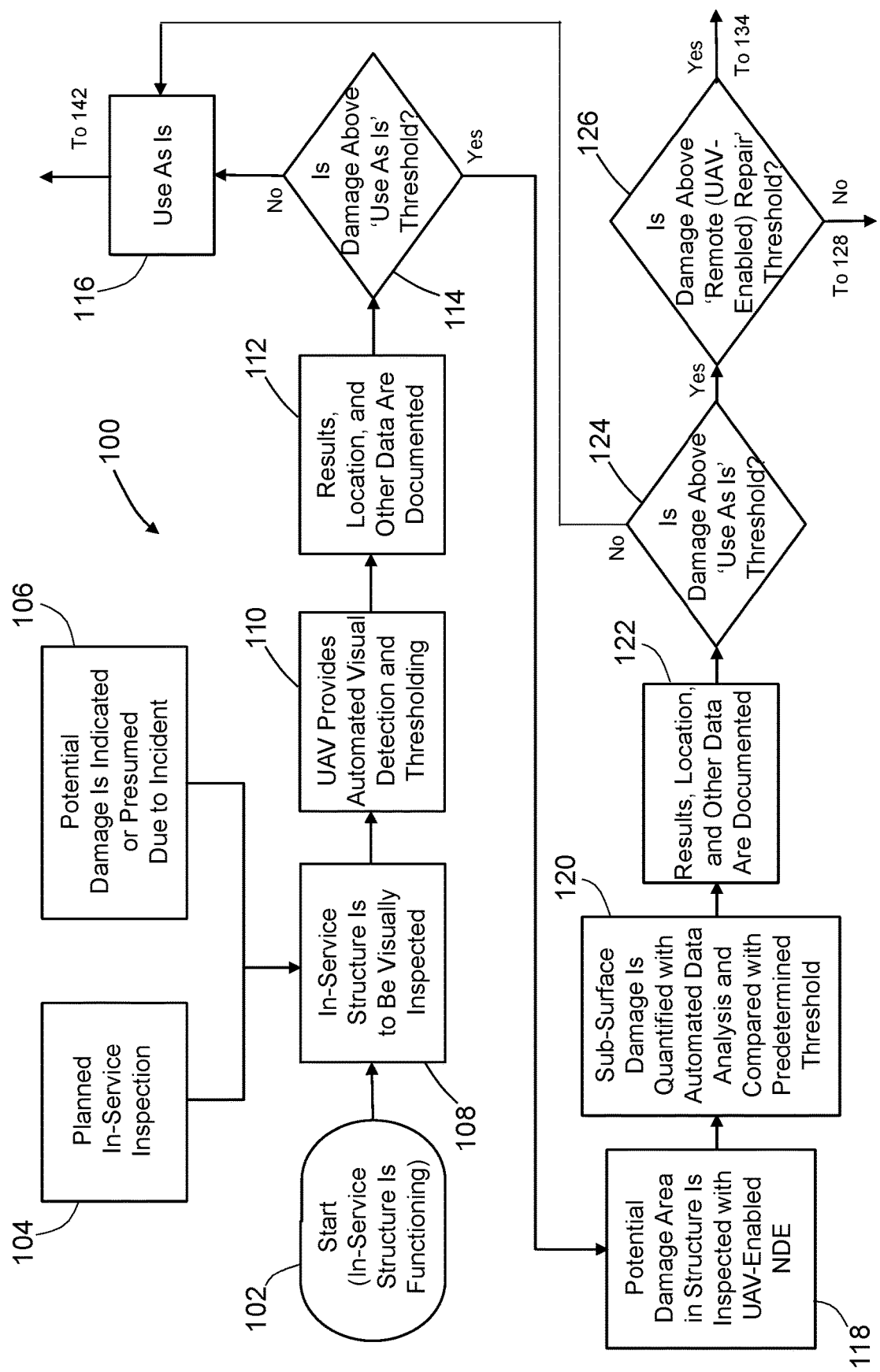
FIGS. 1A and 1B form a flowchart identifying steps of a method for inspecting and repairing a damaged portion of a large structure or object using one or more UAVs in accordance with some embodiments.

For the purpose of illustration, methods for inspecting and repairing a damaged portion of a large structure or object using one or more UAVs will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

In accordance with the embodiments disclosed in some detail below, the UAV takes the form of a rotorcraft having at least three rotors. In accordance with the implementation disclosed herein, each rotor has two mutually diametrally opposed rotor blades. However, in alternative implementations, UAVs having rotors with more than two rotor blades may be used. As used herein, the term "rotor" refers to a rotating device that includes a rotor mast, a rotor hub mounted to one end of the rotor mast, and two or more rotor blades extending radially outward from the rotor hub. In the embodiments disclosed herein, the rotor mast is mechanically coupled to an output shaft of a drive motor, referred to hereinafter as a "rotor motor". The rotor motor drives rotation of the rotor. As used herein, the term "rotor system" means a combination of components, including at least a plurality of rotors and a controller configured to control rotor rotation rate to generate sufficient aerodynamic lift force to support the weight of the UAV and sufficient thrust to counteract aerodynamic drag in forward flight. The UAVs disclosed herein include a controller which preferably takes the form of a plurality of rotor motor controllers that communicate with an on-board computer configured to coordinate the respective rotations of the rotors. The controller is configured (e.g., programmed) to control the rotors to cause the UAV to fly along a flight path to a location where the UAV is in proximity or contact with an area on the surface of a structure to be inspected and repaired.

In accordance with various embodiments of the process proposed herein, one or more UAVs are configured to perform visual detection, non-destructive evaluation (NDE), and repair in a manner that enables a large structure, such as an aircraft or a wind turbine, to be returned to service quickly after an impact incident or discovery of potential damage. The camera-equipped UAV has an on-board computer that is configured (e.g., programmed) to determine whether the image data acquired from the area of interest on the structure indicates damage above a first "use as is" threshold or not. If the damage is above the first "use as is" threshold, a UAV-enabled NDE is initiated. The NDE sensor-equipped UAV has an on-board computer that is configured (e.g., programmed) to determine whether the NDE sensor data acquired from the structure in the area of interest indicates damage in a specified range between a second "use as is" threshold and a "remote repair" threshold or not. If the damage is within the specified range, a UAV-enabled repair is initiated.

Figure 1B:
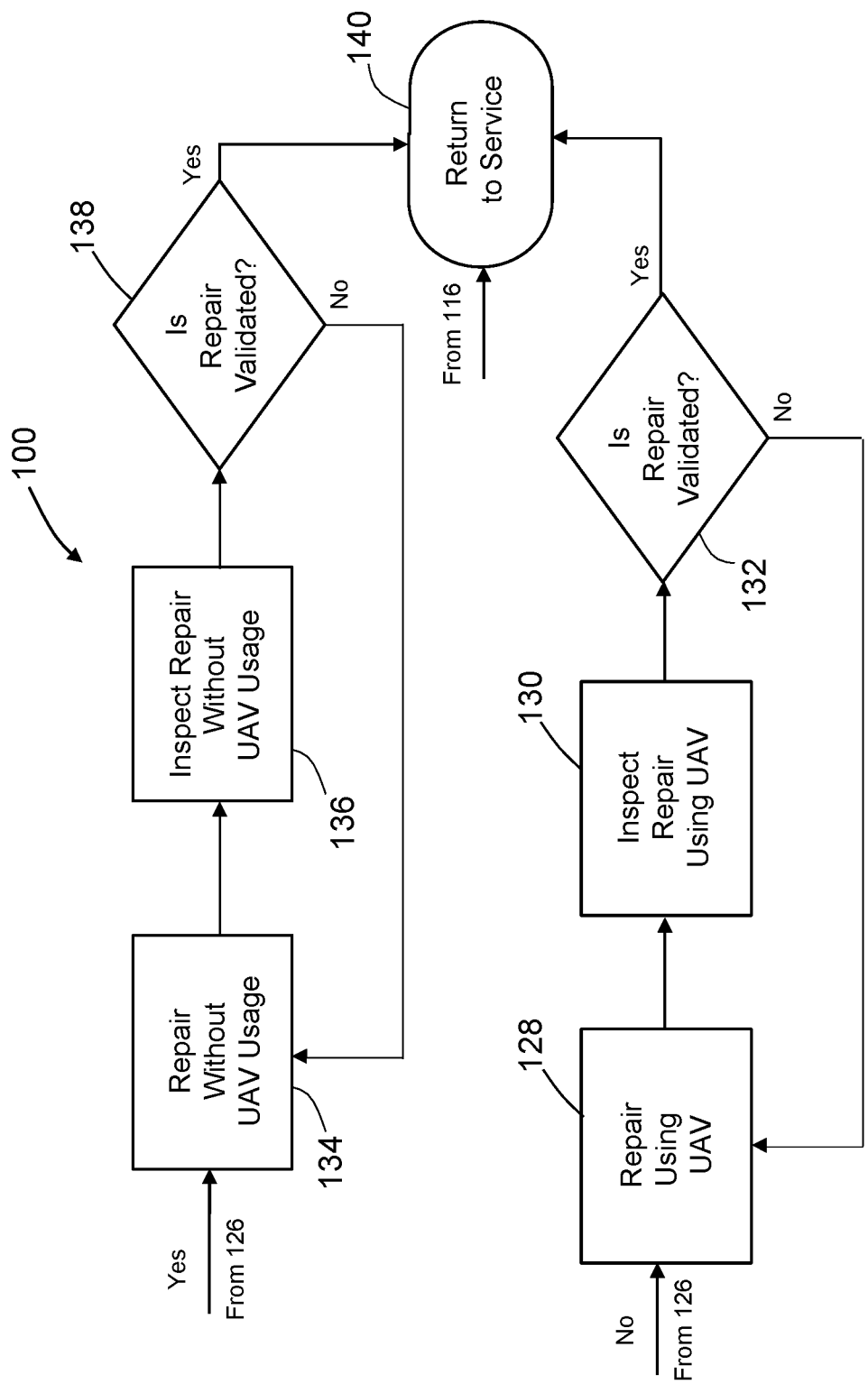

FIGS. 1A and 1B form a flowchart identifying steps of a method 100 for inspecting and repairing a damaged portion of a large structure or object that is in service using one or more UAVs in accordance with some embodiments. As will be explained in more detail below, a computer on-board the UAV may be configured to determine whether acquired data indicates damage greater (above) or less (below) than a particular threshold value. As used herein, a "use as is" threshold means a threshold which has been specified to demarcate between structure that does not require a repair (e.g., if the indicated damage is less than or below the "use as is" threshold) and structure that potentially requires repair (e.g., if the indicated damage is greater than or above the "use as is" threshold). As used herein, a "remote repair" threshold means a threshold which has been specified to demarcate between structure that requires a repair that could be performed by a UAV (e.g., if the indicated damage is less than or below the "remote repair" threshold) and structure that requires a repair not performed by a UAV (e.g., if the indicated damage is greater than or above the "remote repair" threshold).

Referring to FIG. 1A, at the start 102 of the method 100, the in-service structure is functioning, but either the scheduled time for a planned in-service inspection has arrived (step 104) or potential damage to the in-service structure is indicated or presumed due to an incident (step 106). For example, an object impact event has been detected or suspected.

The overall inspection and repair process is initiated when a maintenance operations center dispatches a UAV equipped with a camera to perform a visual inspection of the in-service structure (step 108). The dispatched UAV flies to the vicinity of the possible impact area (hereinafter "area of interest"), uses the camera to acquire images of the area of interest, and then compares the acquired image data to a first "use as is" threshold (step 110). The results of the visual inspection and thresholding, the location of the imaged area and other data are then recorded in a non-transitory tangible computer-readable storage medium on-board the camera-equipped UAV (step 112). A computer on-board the camera-equipped UAV then makes a determination whether the damage indicated by the image data is above the first "use as is" threshold or not (step 114). In the alternative, if the camera-equipped UAV is not also equipped with an NDE sensor unit, then the camera-equipped UAV wirelessly transmits data representing the results of the visual inspection and thresholding, data representing the location of the imaged area and other data to the maintenance operations center, which has a computer configured to make the determination in step 114.

On the one hand, if a determination is made in step 114 that the damage indicated by the image data is not above the first "use as is" threshold, then the structure is used as is (step 116) and returned to service (step 140 in FIG. 1B). On the other hand, if a determination is made in step 114 that the damage indicated by the image data is above the first "use as is" threshold, then a UAV equipped with an NDE sensor unit (which may be the same UAV as the camera-equipped UAV or a separate UAV) is flown to a location where the NDE sensor unit is within an measurement range of the potentially damaged area (hereinafter "potential damage area") on the surface of the structure. For example, the NDE sensor-equipped UAV may land on the surface of the structure and then use the NDE sensor unit to acquire NDE sensor data in the potential damage area (step 118). The computer on-board the NDE sensor-equipped UAV then performs an analysis the NDE sensor data that quantifies the sub-surface damage and compares the resulting quantitative data to various predetermined thresholds (step 120). The results of the analysis and thresholding, the location of the sensed area and other data are then recorded in a non-transitory tangible computer-readable storage medium on-board the NDE sensor-equipped UAV (step 122). A computer on-board the NDE sensor-equipped UAV then makes a determination whether the damage indicated by the NDE sensor data is above a second "use as is" threshold or not (step 124). In the alternative, if the NDE sensor-equipped UAV is not also equipped with a repair tool, then the NDE sensor-equipped UAV wirelessly transmits data representing the results of the analysis and thresholding, data representing the location of the sensed area and other data to the maintenance operations center, which has a computer configured to make the determination in step 124.

On the one hand, if a determination is made in step 124 that the damage indicated by the NDE sensor data is not above the second "use as is" threshold, then the structure is used as is (step 116) and returned to service (step 142 in FIG. 1B). On the other hand, if a determination is made in step 124 that the damage indicated by the NDE sensor data is above the second "use as is" threshold, then the computer on-board the NDE sensor-equipped UAV then makes a determination whether the damage indicated by the NDE sensor data is below a "remote repair" threshold or not (step 126). In the alternative, if the NDE sensor-equipped UAV is not also equipped with a repair tool, then the maintenance operations center has a computer programmed to make the determination in step 124.

Depending on the outcome of step 126 (shown in FIG. 1A), the process may proceed in accordance with either a remote or UAV-enabled repair procedure or a manual repair procedure that requires human intervention, the steps of both of which are identified in FIG. 1B. On the one hand, if a determination is made in step 126 that the damage indicated by the NDE sensor data is not above the "remote repair" threshold, then a UAV equipped with a repair tool (which may be the same UAV as the camera-equipped UAV or a separate UAV) is flown to a location where the repair tool is or may be placed in contact with the structure in the area to be repaired. While the repair tool-equipped UAV is stationary, the damage area is repaired using the repair tool (step 128 in FIG. 1B). On the other hand, if a determination is made in step 126 that the damage indicated by the NDE sensor data is above the "remote repair" threshold, then the NDE sensor-equipped UAV wirelessly transmits a message notifying the maintenance operations center that the structure requires direct human access for a more in-depth or complicated repair of the damaged structure (step 134 in FIG. 1B). In the latter case, a UAV-enabled repair is not made.

Still referring to FIG. 1B, following completion of the UAV-enabled repair in step 128, a UAV equipped with either a camera or an NDE sensor unit (which may be the same UAV as the camera-equipped or NDE sensor-equipped UAV described above or a separate UAV) is used to perform an inspection to verify that the repaired structure is good for service (step 130). The results of the inspection are stored in a non-transitory tangible computer-readable storage medium on-board the inspecting UAV and the UAV wirelessly transmits a message to the maintenance operations center reporting completion of the repair. A determination is then made whether the repair is validated or not (step 132). On the one hand, if the repair is not validated, then the repair procedure returns to step 128. On the other hand, if the repair is validated, then the repaired structure is returned to service (step 140).

Conversely, following issuance of the notification indicating that a repair by means not including a UAV (e.g., a manual repair) is recommended, the maintenance operations center dispatches appropriately equipped technicians to conduct a repair of the damaged area on the structure (step 134). Following completion of the repair by means not including a UAV in step 134, a NDE or visual inspection of the repaired portion of the structure is performed, also by means not including a UAV (step 136). A determination is then made whether the repair is validated or not (step 138). On the one hand, if the repair is not validated, then the repair procedure returns to step 134. On the other hand, if the repair is validated, then the repaired structure is returned to service (step 140).

Figure 2:
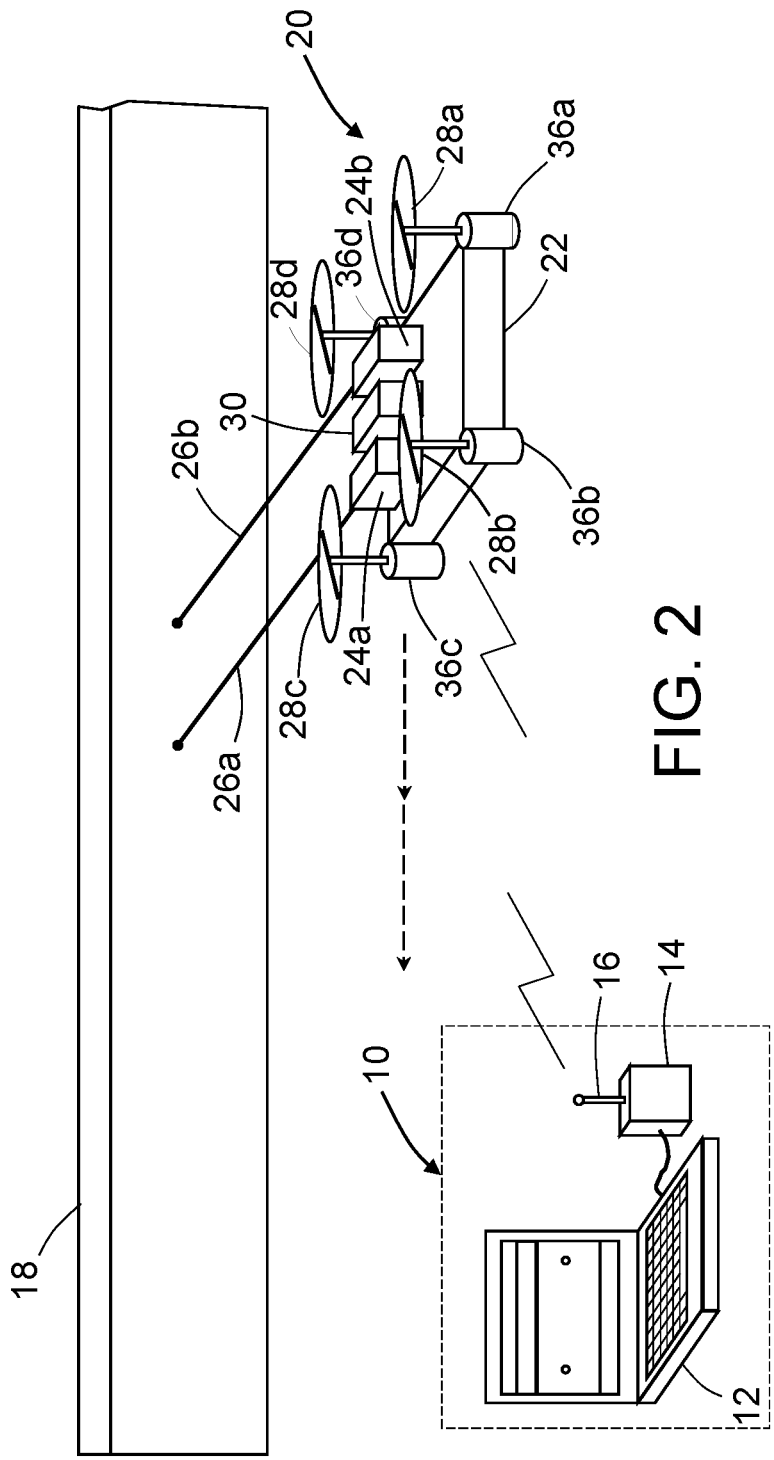
FIG. 2 is a diagram representing a three-dimensional view of a system for visually inspecting a structure using an airborne UAV having a pair of laser devices and a camera on-board in accordance with some embodiments.

FIG. 2 is a diagram representing a three-dimensional view of a system for visually inspecting a structure 18 using an airborne UAV 20. The UAV 20 depicted in FIG. 2 comprises a base 22 and four rotors 28a-28d which are supported by and rotatable relative to the base 22. Rotation of each rotor is driven by a respective rotor motor 36a-36d mounted to the base 22.

The UAV 20 further includes a pair of laser devices 24a and 24b and a video camera 30, all supported on the base 22. In the proposed implementation depicted in FIG. 2, the pair of laser devices 24a and 24b are arranged on opposite sides of the video camera 30. In the alternative, a still camera (color and/or black and white) or an infrared camera may be employed. The pair of laser devices 24a and 24b are fixedly mounted to the base 22 with non-parallel axes. When activated, the laser devices 24a and 24b emit respective laser beams 26a and 26b which are directed toward respective points on the surface of the structure 18, thereby forming respective laser spots. The impingement of laser beams 26a and 26b on a surface of the structure 18 enables the acquisition of information concerning the location of the UAV 20 relative to the structure 18. More specifically, the distance separating the laser spots in the captured image is directly proportional to the distance separating the structure 18 and UAV 20. Once this frame of reference has been established, the onboard computer may further calculate a dimension of a visually distinctive area appearing in the captured image.

The system depicted in FIG. 2 further includes a remote control station 10 for sending and receiving wireless communications to and from the UAV 20. In accordance with one embodiment, the remote control station 10 comprises a laptop computer 12, a transceiver 14 and an antenna 16. The transceiver 14 is in communication with the antenna 16 for enabling communication between the laptop computer 12 and a computer on-board the UAV 20.

The on-board system of the UAV 20 may further comprise a guidance and control hardware and software system (not shown in FIG. 2) that is able to implement one or more different, stored flight plans digitally represented by flight plan data stored in a non-transitory tangible computer-readable storage medium (not shown in FIG. 2). The on-board system may further comprise a global positioning system/inertial navigation system (GPS/INS) for controlling the orientation of UAV 20 and assisting in carrying out the preprogrammed flight plan stored in memory. A wireless transceiver and an on-board antenna (not shown in FIG. 2) enable bidirectional, wireless electromagnetic wave communications with the remote control station 10.

Unmanned aerial vehicles of the type depicted in FIG. 2 may be upgraded with the capability to acquire scale and point-to-point distance information for objects undergoing visual inspection. The UAV 20 may be provided with on-board sensors and processing techniques to provide discrete or continuous measurements of the distances between points on a target object or the scale of the target object. Various embodiments of such an enhanced-capability UAV are disclosed in U.S. patent application Ser. No. 15/714,662.

The video camera 30 may be activated to capture an image in which the two laser spots are visible. This image data can be processed to derive pixel information which, in conjunction with the known distance separating the axes of the two laser devices 24a and 24b, may be used to determine a scale factor. That scale factor can then be used to display a scale indicator on any subsequent image captured by the video camera 30 while the UAV 20 is hovering in proximity to structure 18. The size of a visually distinctive area in the captured image may be calculated by an onboard computer using image processing techniques to segment the area of interest and then apply the scale factor to determine a dimension of the area. More specifically, the distance between the UAV 20 and the structure 18 may be estimated.

Figure 3:
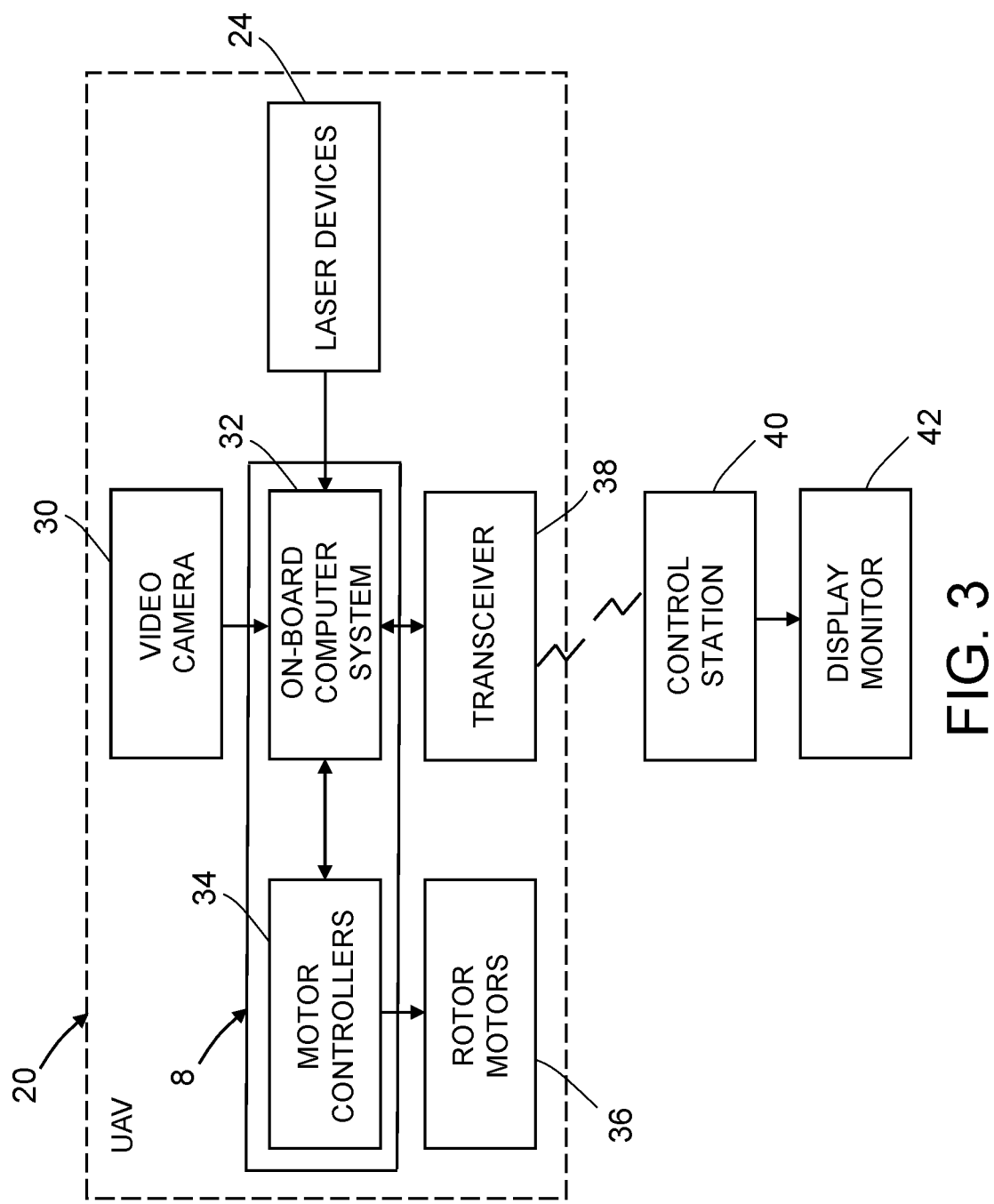
FIG. 3 is a block diagram identifying some components of a system for performing visual inspection of a structure using a remote-controlled UAV of the type depicted in FIG. 2.

FIG. 3 is a block diagram identifying some components of a system for performing visual inspection of a structure using a remote-controlled UAV 20 having two or more laser devices 24 (e.g., laser devices 24 and 24b as seen in FIG. 2) mounted thereon. In this example, the UAV 20 and the equipment carried by the UAV 20 are controlled by the on-board computer system 32 as a function of radiofrequency commands transmitted by a control station 40. Those radiofrequency commands are received by a transceiver 38 on-board the UAV 20, converted into the proper digital format and then forwarded to the computer system 32. The control station 40 may comprise a general-purpose computer system configured with programming for controlling operation of the UAV 20 and the equipment on-board the UAV 20 by sending commands to the computer system 32. For example, the control station 40 may send commands controlling the flight of the UAV 20 and commands for activation of the laser devices 24. In addition, the computer system at the control station 40 is configured with programming for processing data received from the UAV 20 during an inspection operation. In particular, the computer system of the control station 40 may comprise a display processor configured with software for controlling a display monitor 42 to display images acquired by the video camera 30. The optical image field, as sighted by the video camera 30, may be displayed on the display monitor 42.

In response to commands from the control station 40, the video camera 30 and the laser devices 24 are activated by control signals transmitted (e.g., via electrical cables on-board UAV 20) by the on-board computer system 32. The video camera 30 may have automated (remotely controlled) zoom capabilities. The on-board computer system 32 also controls the flight of the UAV 20 by sending commands to the motor controllers 34 which respectively control the rotation of respective rotor motors 36, such as rotor motors 36a-36d that drive rotation of rotors 28a-28d respectively (see FIG. 2).

The computer system 32 on-board UAV 20 is also programmed to quantify the damage measured by the video camera 30. In some situations, it may be desirable to determine whether damage satisfies a predetermined criterion that defines a predetermined linear dimension such as a predetermined depth or a predetermined length of an anomaly (e.g., a crack). For example, a longest chord of the damage area is measured between the two most distant pixels within the image of the damage. In this example, determining whether damage satisfies a predetermined linear dimension comprises determining whether the longest chord exceeds a predetermined length.

In some situations, it may be desirable to determine whether a damage area satisfies a predetermined criterion that defines a predetermined area. For example, a longest chord and a second chord are measured in order to determine an area measurement of damage area by multiplication of the two chords. The second chord spans the largest part of the damage along an axis that is perpendicular to the longest chord. In this example, determining whether damage satisfies a predetermined criterion comprises determining whether such an area measurement exceeds a predetermined area.

In accordance with one proposed implementation, the on-board computer system 32 is configured to employ image processing software that using techniques such as edge recognition and image segmentation to isolate pixels representing a potential damage area. In one example proposed implementation, the image of the potential damage area is segmented into separate areas, which may include filtering using size, color, shape, or other parameters. Image segmentation means defining a group of pixels with a specific characteristic. In accordance with one implementation, pixels of a specific color and intensity that are next to each other (i.e. contiguous regions) are found. The image will also have some small artifacts (such a subtle edge outlines) that will be filtered out. This can be done using a blur filter and an intensity threshold filter. Selected pixel coordinates corresponding to pairs of separated pixels representing the aforementioned chords of the potential damage area are then used to determine a dimension of the potential damage area or a feature thereof.

As previously described, following completion of the visual inspection by the UAV depicted in FIG. 2, the area of interest on the structure 18 is subjected to non-destructive examination (NDE). In one example operation, a UAV equipped with one or more NDI devices supported by one or more support structures, such as a manipulator arm, is flown to a target region of the structure being inspected. The UAV operator instructs the UAV to position a NDI device, such as by extending a manipulator arm, onto the target region. The NDI device can have a securing mechanism, such as magnetic-based devices, e.g., an electro-permanent magnet, for ferromagnetic structures, and/or vacuum-based, electrostatic-based, adhesive-based, gripper-based devices for non-ferro-magnetic structure.

For example, an electro-permanent magnet can be enabled with an electrical pulse and then stay energized without using power. When the electro-permanent magnet is energized, the UAV can be physically secured onto the target region and supported when it comes into contact with it. After being physically secured to the target region, the rotors on the UAV can then turned off (stop rotating) where the UAV is now is in a stable stationary position. The NDE sensor unit can then be activated to take inspection readings. The three-dimensional location of the UAV can be measured by an off-board tracking system, such as a local positioning system ("LPS"), which can determine the location of the UAV in terms of a coordinate system of the structure being inspected. Once the NDE is complete, the rotors of the UAV can be started, the securing mechanism deactivated, and the UAV flies away, or to the next inspection location, and the process is repeated.

Figure 4:
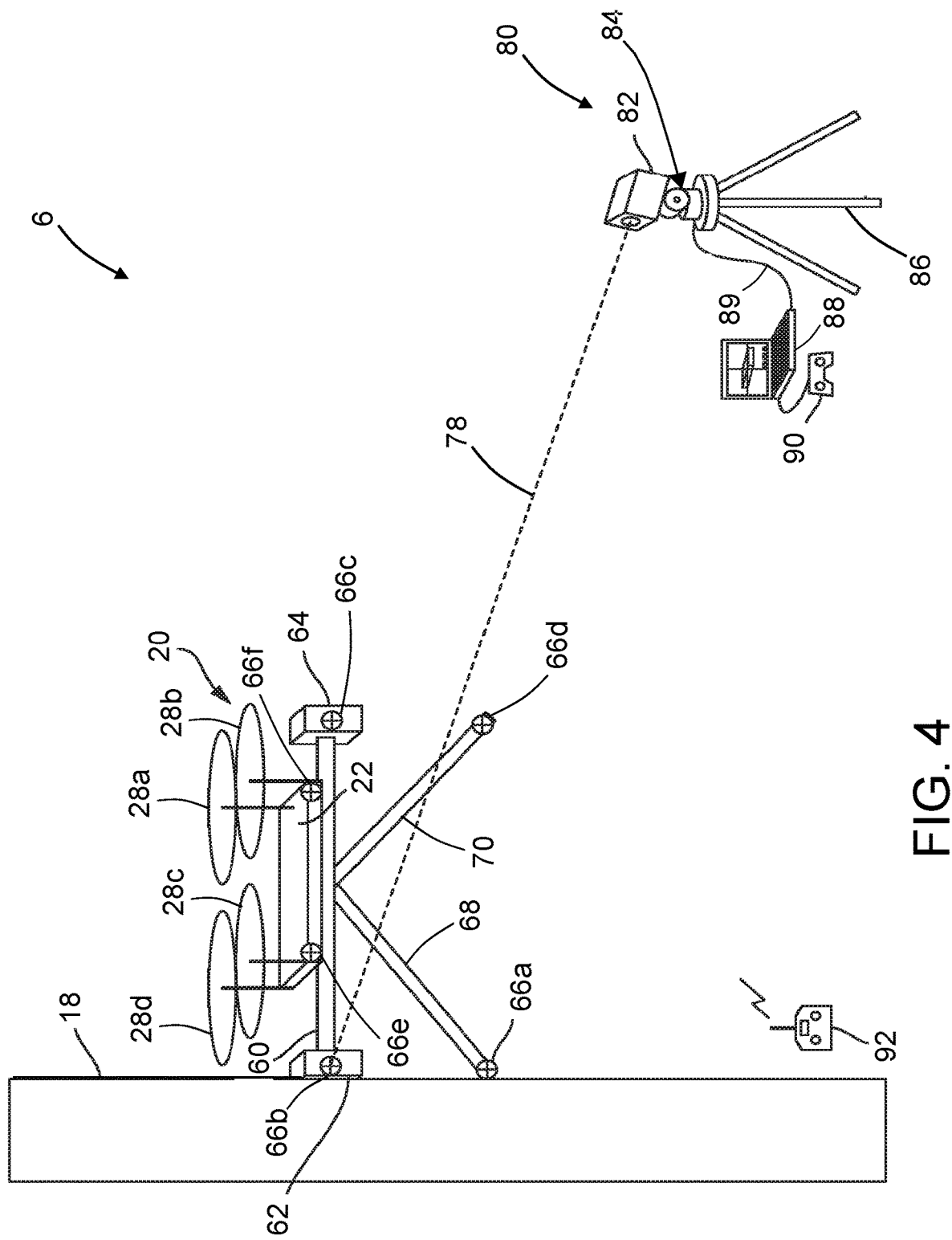
FIG. 4 is a diagram representing a three-dimensional view of a system for non-destructive inspection of a structure using an airborne UAV equipped with a non-destructive inspection sensor (hereinafter "NDE sensor unit") unit in accordance with some embodiments.

FIG. 4 is a diagram representing a three-dimensional view of a system 6 for non-destructive examination of a structure 18 using an airborne UAV 20 equipped with an NDE sensor unit 62 in accordance with one embodiment. The system 6 includes a UAV 20 that may be flown to the vicinity of a structure 18 to be inspected. The UAV 20 may include an onboard system that is able to navigate the UAV 20 in accordance with a preprogrammed flight plan and to enable the acquisition of inspection data from the structure 18. In some examples, the UAV 20 can be flown along a flight path by an operator using a wireless UAV controller 92.

The frame of UAV 20 includes a base 22 that supports a beam 60 having the NDE sensor unit 62 attached to one end and a counterweight 64 attached to the other end. In alternative embodiments, the NDE sensor unit 62 may be attached to the end of a manipulator arm, wherein the manipulator arm comprises a gripper, wherein the gripper is operable to manipulate the NDE sensor unit 62 relative to the structure 18 being inspected. In some examples, a repair tool may be attached to the other end of the beam 60 instead of the counterweight 64. For example, the repair tool may be a sander (for removing material from a damage site) or a sprayer (for adding material to a damage site).

The frame of the UAV 20 further includes a standoff system (only standoff support members 68 and 70 are shown in FIG. 4) for maintaining the NDE sensor unit 62 in a standoff position relative to the surface being inspected. The frame of the UAV 20 further includes multiple standoff arms having distal ends which contact. In the example depicted in FIG. 4, when the UAV 20 is docked to or physically secured to the structure 18, the standoff arms provide positional stability of the NDE sensor unit 62 with respect to the structure 18, which allows the NDE sensor unit 62 to acquire higher spatial resolution of damage and time-dependent sensing (like IR thermography) to be performed.

The NDE sensor unit 62 may be selected from the following group: eddy current sensors, ultrasonic sensors, acoustic sensors, mechanical impedance sensors, optical sensors, x-ray backscatter sensors, computed tomography sensors, surface roughness sensors, IR thermography devices, microwave sensors, and terahertz sensors. The NDE sensor unit 62 may be equipped with a securing mechanism to physically hold the NDE sensor unit 62 and/or the UAV 20 on a surface of the structure 18, including but are not limited to magnetic-based, vacuum-based, electrostatic-based, adhesive-based, or gripper-based devices.

A multiplicity of optical targets are attached to the frame of UAV 20 for use as calibration points to determine the location of UAV 20 in the frame of reference of structure 18. The example depicted in FIG. 4 includes: a calibration point 66a on a distal end of standoff member 68; a calibration point 66b on the NDE sensor unit 62; a calibration point 66c on the counterweight 64; a calibration point 66d on a distal end of standoff member 70; and calibration points 66e and 66f at respective corners of the base 22.

After being placed on the target region by the UAV 20, the 3-D location of the NDE sensor unit 62 can be measured by an off-board tracking system which is configured to determine the location of the NDE sensor unit 62 relative to the coordinate system of the structure 18. FIG. 4 shows a physical setup in which a local positioning system 80 is used to track a location of the UAV 20 relative to structure 18. The LPS 80 includes a video camera 82 and a laser range meter (not shown) on a controllable pan-tilt mechanism 84 with angle measurement capability mounted on a tripod 86. The video camera 82 may have automated (remotely controlled) zoom capabilities. The video camera 82 may additionally include an integral crosshair generator to facilitate precise locating of a point within an optical image field display of the video camera 82. The video camera 82 and pan-tilt mechanism 84 may be operated by an LPS computer 88. The LPS computer 88 communicates with the video camera 82 and the pan-tilt mechanism 84 through a video/control cable 89. Alternatively, the LPS computer 88 may communicate with video camera 82 and pan-tilt mechanism 84 through a wireless communication pathway. The pan and tilt angles of the pan-tilt mechanism 84 and, therefore, the orientation of the video camera 82 can be controlled using the keyboard of the LPS computer 88 or other input device, such as the gamepad interface 90 shown in FIG. 4.

The pan—tilt mechanism 84 is controlled to positionally adjust the video camera 82 to selected angles around a vertical, azimuth (pan) axis and a horizontal, elevation (tilt) axis. A direction vector 78, that describes the orientation of the video camera 82 relative to the fixed coordinate system of the tripod 86 (or other platform on which the pan-tilt unit 84 is attached), is determined from the pan and tilt angles, as well as the position of the center of a crosshair marker in the optical field when the camera 82 is aimed at a point of interest. This direction vector 78 is depicted in FIG. 4 as a dashed line extending from the lens of the camera 82 and intersecting a calibration point 66b on the distal end of stand-off member 68. The calibration points 66a-66f on the UAV frame and calibration points (not shown in FIG. 4) on the structure 18 will be targeted in turn and the data thus acquired can be processed by the LPS computer 88 to calculate the position and orientation offsets of UAV 20 relative to the structure 18.

A laser range meter may be incorporated inside the housing of camera 82 or mounted to the outside of camera 82 in such a way that it transmits a laser beam along the direction vector 78. The laser range meter is configured to measure the distance to each calibration point. The laser range meter may have a laser and a unit configured to compute distances based on the laser light detected in response to a laser beam reflected by the each calibration point.

The local positioning system 80 shown in FIG. 4 further includes three-dimensional localization software which is loaded into the LPS computer 88. For example, the three-dimensional localization software may be of a type that uses multiple non-collinear calibration points on the structure 18 to define the location (position and orientation) of video camera 82 relative to the structure 18. Calibration points can be temporarily attached to the structure 18 by the UAV 20. Alternatively, visually distinctive features of the structure 18 can be used as calibration points. The measured distances to the calibration points may be used in coordination with the pan and tilt angles from the pan-tilt mechanism 84 to determine the location of the UAV relative to the structure 18.

Figure 5:
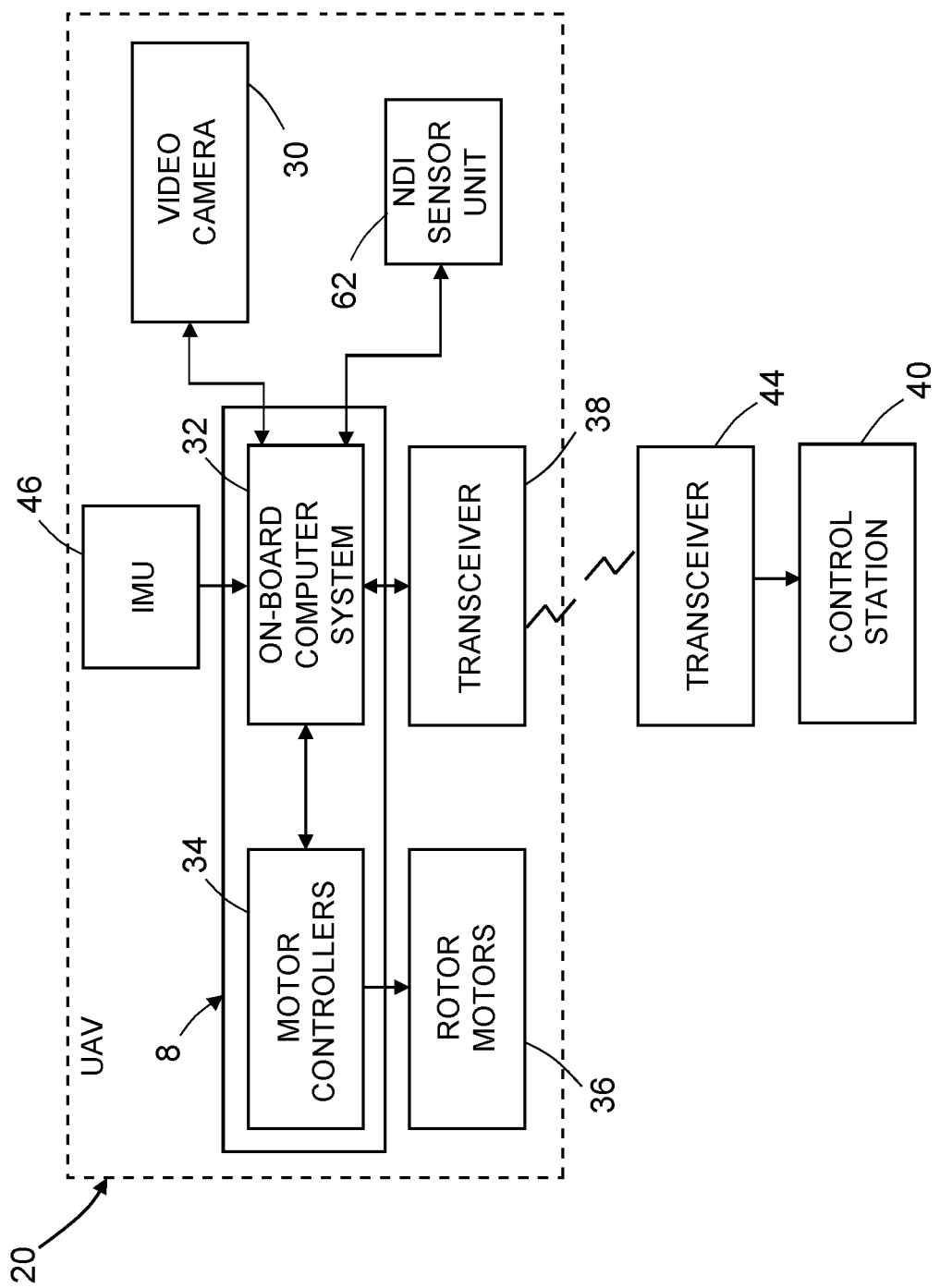
FIG. 5 is a block diagram identifying some components of a system for performing non-destructive inspection of a structure using an airborne UAV of the type depicted in FIG. 4.

FIG. 5 is a block diagram identifying some components of a system for performing non-destructive evaluation of a structure using an airborne UAV 20 of the type depicted in FIG. 4. The UAV 20 has a control system 8 that controls UAV flight and operation of the video camera 30 and the NDE sensor unit 62. More specifically, the control system 8 includes respective motor controllers 34 for controlling the rotational speed and direction of the rotor motors 36 and a computer system 32 that controls operation of the motor controllers 34, video camera 30 and NDE sensor unit 62. In one proposed implementation, the motor controllers 34 are electronic speed control circuits configured to vary an electric motor's speed, direction and braking, while the rotor motors 36 are brushless electric motors. Such electronic speed control circuits provide high-frequency, high-resolution three-phase AC power to the rotor motors 36.

In the embodiment partly depicted in FIG. 5, the UAV 20, video camera 30 and NDE sensor unit 62 are controlled by a computer system 32 as a function of radiofrequency commands transmitted by a control station 40. Those radiofrequency commands are transmitted by a transceiver 44 on the ground; received by a transceiver 38 on-board the UAV 20; converted by the transceiver 38 into the proper digital format; and then forwarded to the computer system 32. The control station 40 may comprise a general-purpose computer system configured with programming for controlling operation of the UAV 20 and the NDE sensor unit 62 on-board the UAV 20. For example, the flight of the UAV 20 can be controlled using a joystick, keyboard, mouse, touchpad, or touchscreen of a computer system at the control station 40 or other user interface hardware (e.g., a gamepad or a pendant). In addition, the computer system at the control station 40 is configured with programming for processing data received from the UAV 20 during an inspection operation. In particular, the computer system of the control station 40 may comprise a display processor configured with software for controlling a display monitor (not shown in FIG. 5) to display images acquired by the video camera 30.

Still referring to FIG. 5, the equipment on-board the UAV 20 further comprises an inertial measurement unit 46 (hereinafter "IMU 46"). An inertial measurement unit works by detecting linear acceleration using one or more accelerometers and rotational rate using one or more gyroscopes. In a typical configuration, an inertial measurement unit comprises one accelerometer and one gyroscope per axis for each of the three vehicle axes: pitch, roll and yaw. The computer system 8 may further comprise a separate processor configured with inertial navigation software that utilizes the raw IMU measurements to calculate attitude, angular rates, linear velocity and position relative to a global reference frame. The data collected from the IMU 46 enables the computer system 32 to track the UAV's position using a method known as dead reckoning.

As previously described, following completion of the non-destructive evaluation by the UAV depicted in FIG. 4, the area of interest on the structure 18 is subjected to a repair. In one example operation, a UAV equipped with one or more repair tools devices supported by one or more support structures, such as a pivoting or telescoping arm, is flown to a target region of the structure to be repaired. The UAV operator instructs the UAV to position a repair tool onto the target region. The repair tool-equipped UAV can have a securing mechanism, such as magnetic-based devices, e.g., an electro-permanent magnet, for ferromagnetic structures, and/or vacuum-based, electrostatic-based, adhesive-based, gripper-based devices for non-ferromagnetic structure.

Figure 6:
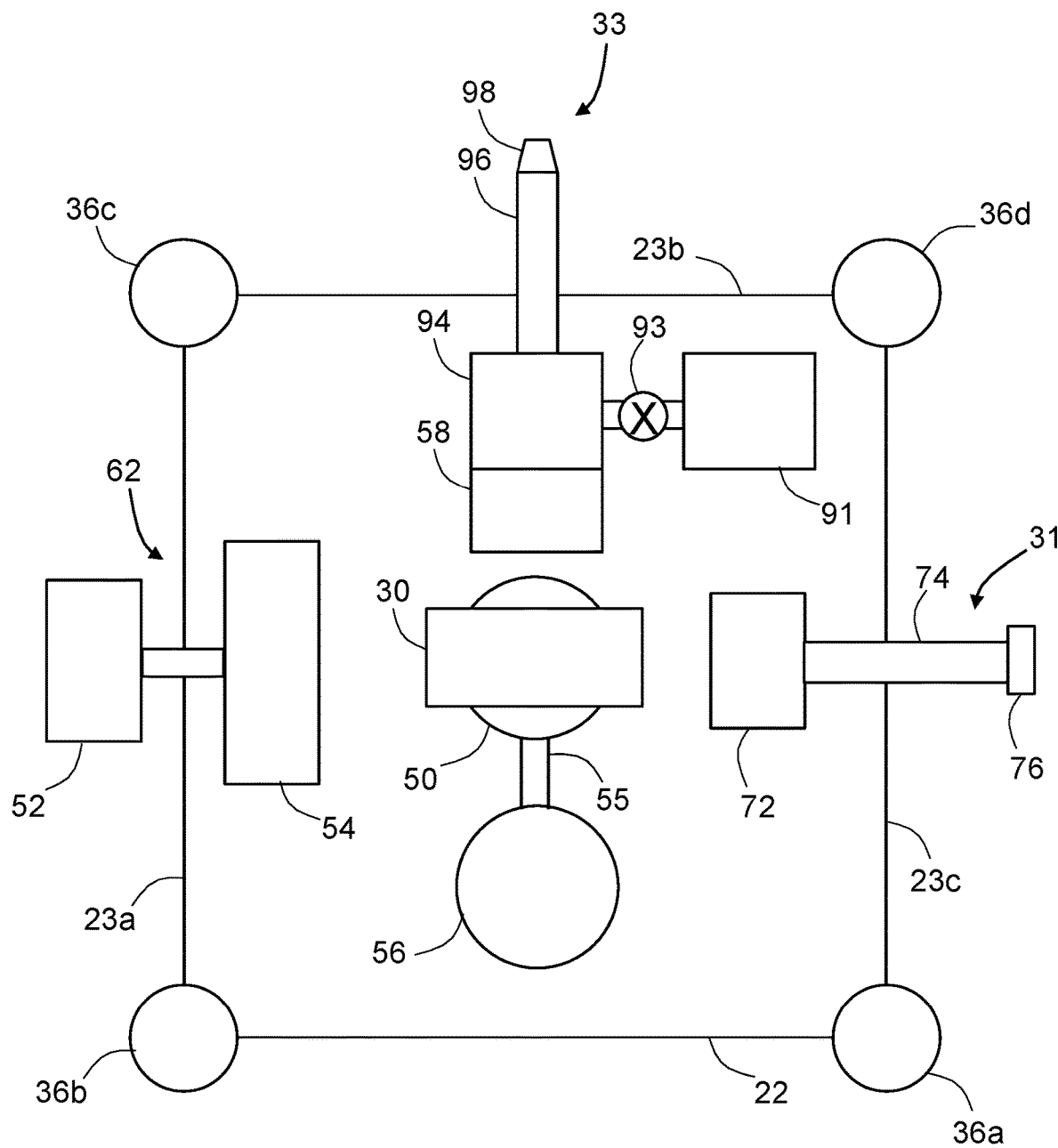
FIG. 6 is a diagram representing a plan view of a UAV equipped with a camera, an NDE sensor unit and a repair tool in accordance with one embodiment.

FIG. 6 is a diagram representing a plan view of a UAV 20 equipped with a video camera 30, an NDE sensor unit 62, a subtractive repair tool 31, and an additive repair tool 33 mounted to a base 22. As used herein, the term "subtractive repair tool" means a tool that is configured to remove material from a body of material, whereas the term "additive repair tool" means a tool that is configured to add material to a body of material. The base 22 also supports one or more batteries (not shown) which provide electric power to all of the electrically powered devices carried by UAV 20. The base 22 also supports the rotor motors 36a-36d which drive rotation of respective rotors (not shown in FIG. 6, but see rotors 28a-28d in FIG. 4).

In accordance with the embodiment depicted in FIG. 6, the NDE sensor unit 62 includes a sensor array 52 and an array controller 54. In one proposed implementation, the sensor array 52 is a two-dimensional array of sensors arranged in columns and rows. The sensor array 52 is in electronic communication with the array controller 54, for example, by way of a cable. The subtractive repair tool 31 includes a rotary shaft 74 having an abrasive head 76 at the distal end of the rotary shaft 74 for sanding or grinding a damaged surface of a structure to prepare the surface for the application of a coating. The rotary shaft 74 is driven to rotate by a rotary tool motor 72 mounted to the base 22 of the UAV 20. The additive repair tool 33 includes a pump 94 that pumps liquid material through a tube 96, out a nozzle 98 and onto the surface of the structure within the damage area. The pump 94 pumps liquid out of a storage canister 91, through an electronically controlled valve 93 which has been opened, along the tube 96 and out the nozzle 98 when a pump motor 58 is activated. The pump motor 58, pump 94 and storage canister 91 are mounted to the base 22 of the UAV 20.

The proposed implementation depicted in FIG. 6 further includes a video camera 30 which is seated on and attached to a camera turret 50 which is rotatably coupled to a central portion of the base 22 of UAV 20. The camera turret 50 is driven to rotate by a camera turret motor 56 by way of a gear train 55. The video camera 30 is rotatable about an axis perpendicular to the plane of base 22. As seen in the plan view of FIG. 6, the NDE sensor unit 62, subtractive repair tool 31, and additive repair tool 33 may be arranged on the base 22 so that the sensor array 52 is disposed beyond a first side 23a of base 22, the nozzle 98 is disposed beyond a second side 23b of base 22 and the abrasive head 76 is disposed beyond a third side 23c of base 22. The camera turret 50 is arranged such that in a first angular position the sensor array 52 is in the field-of-view of the video camera 30, in a second angular position the nozzle 98 is in the field-of-view of the video camera 30, and in a third angular position the abrasive head 76 is in the field-of-view of the video camera 30. This allows the video camera 30 to capture respective images during different phases of a remote inspection/repair task. The images are wirelessly transmitted to the maintenance operations center, thereby enabling maintenance personnel to observe the damage area on the structure during NDE and repair operations.

For example, the UAV 20 depicted in FIG. 6 is designed to land on a surface of a structure at a position with a first orientation such that the sensor array 52 overlies the damage area. The NDE sensor unit 62 is then activated to perform an NDE procedure. Upon completion of the NDE procedure, the rotors are then activated to cause the UAV 20 to lift off of the surface, rotate 180 degrees about an axis normal to the surface and then re-land on the surface at the same position with a second orientation such that the abrasive head 76 overlies the damage area. The subtractive repair tool 31 is then activated to remove debris or smoothen the surface in the damage area. Upon completion of the removal of material, the rotors are then activated to cause the UAV 20 to again lift off of the surface, rotate −90 degrees about the axis normal to the surface and then re-land on the surface at the same position with a third orientation such that the nozzle 98 overlies the damage area. The additive repair tool 33 is then activated to apply a sealant or other coating material on the surface in the damage area.

Figure 7:
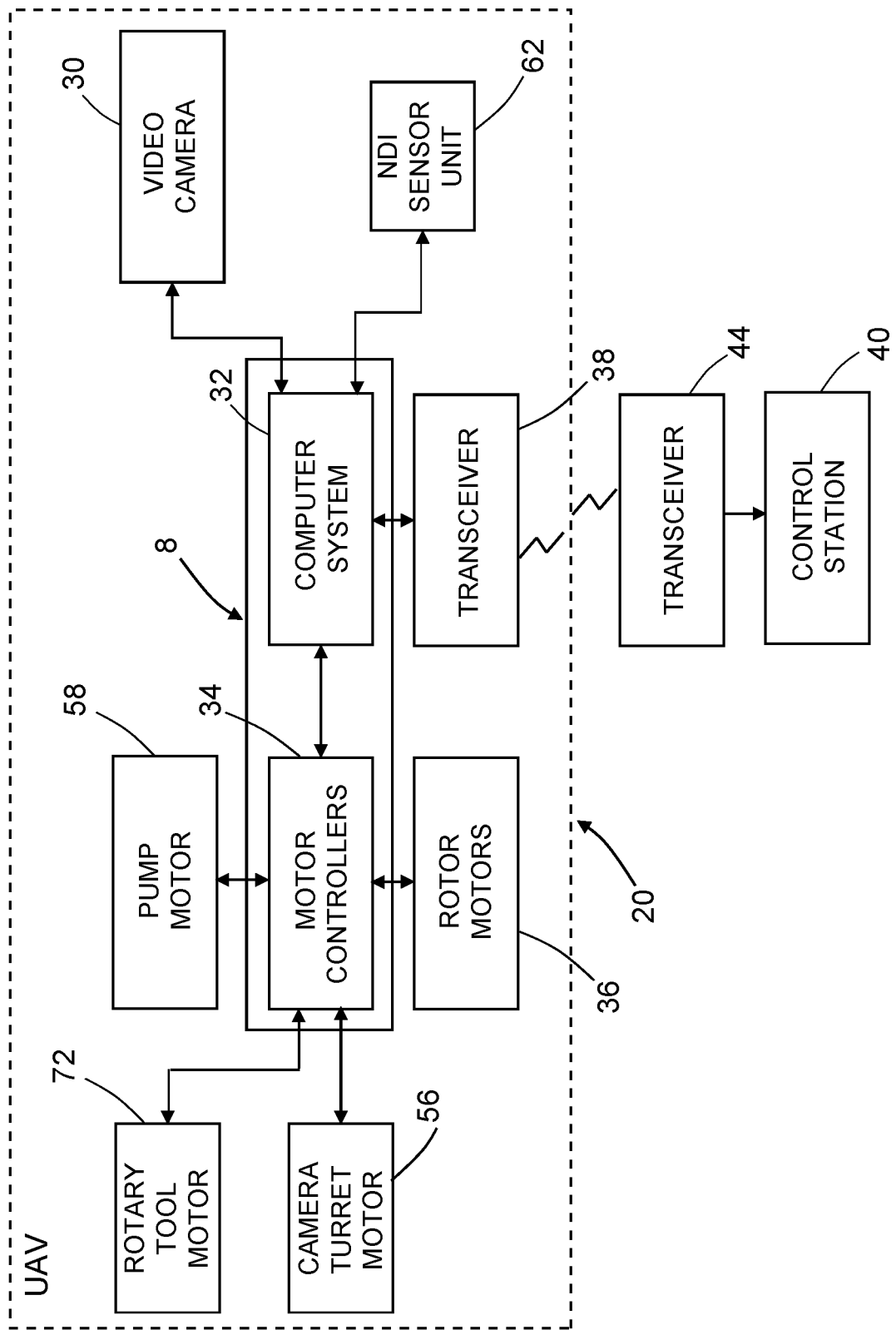
FIG. 7 is a block diagram identifying some of the same and additional components of the UAV depicted in FIG. 6.

FIG. 7 is a block diagram identifying some of the same and additional components of the UAV depicted in FIG. 6. The UAV 20 has a control system 8 that controls UAV flight and operation of the video camera 30 and the NDE sensor unit 62. The control system 8 includes respective motor controllers 34 for controlling the rotational speed and direction of the rotor motors 36, the pump motor 58, the camera turret motor 56 and the rotary tool motor 72. The operation of these motors is coordinated by the computer system 32 to perform the operations described in the immediately preceding paragraph.

Figure 8:
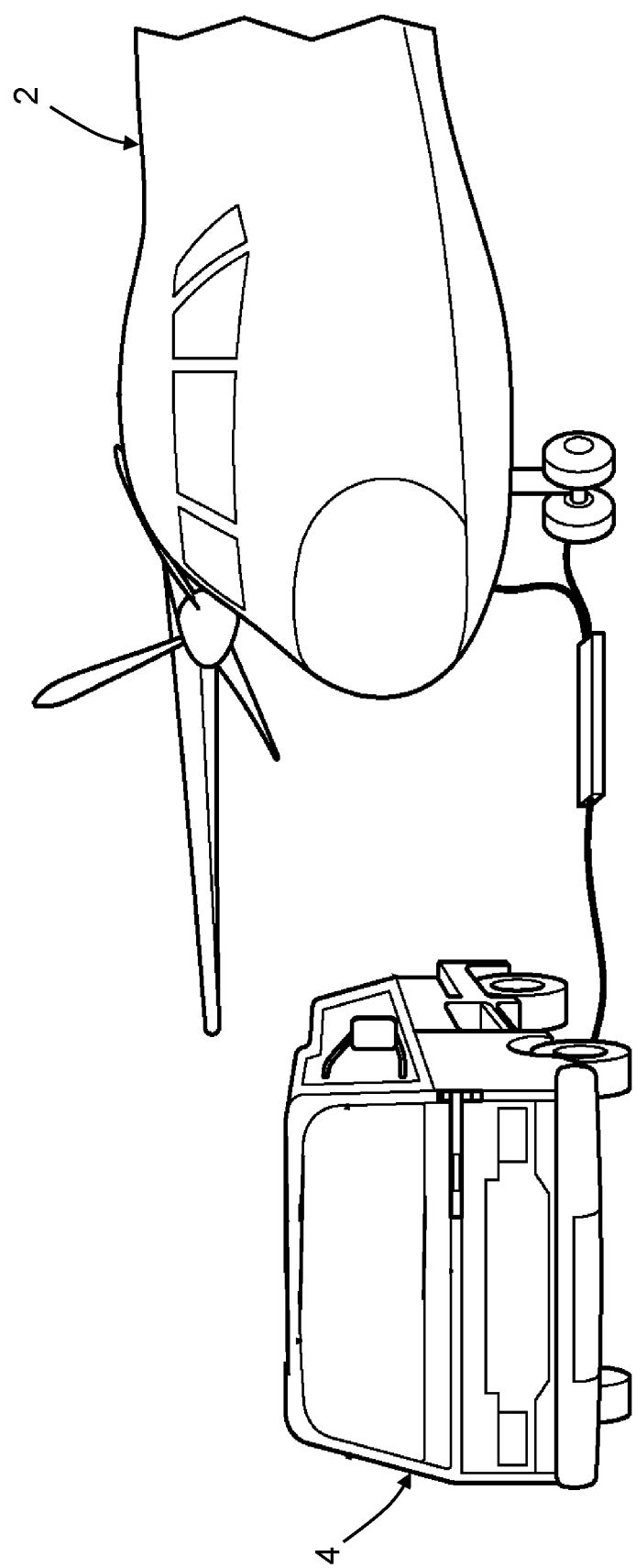
FIG. 8 is a diagram representing a three-dimensional view of an airport operations support vehicle servicing an aircraft.

Rapid inspection and repair of aircraft are important for military and commercial applications in order to decrease down time. For example, the use of composite structures is increasingly common on commercial aircraft. Composites may be damaged in the course of service. Examples of such in-service damage include impact damage due to hail, runway debris (object damage), or collisions with ground support vehicles. FIG. 8 is a diagram representing a three-dimensional view of an airport operations support vehicle 4 servicing an aircraft 2. Before or after such servicing, the airport operations support vehicle 4 may accidentally strike the aircraft 2. As used herein, airport operations support vehicle 4 may be any type of vehicle or equipment used to transport cargo, personnel or equipment on or around an aircraft 2. In some applications, the airport operations support vehicle 4 may be a cargo belt loader, a luggage cart, an aircraft re-fueler, a catering vehicle, a ground power unit, an airport bus or passenger boarding stairs, for example.

In the event that the airport operations support vehicle 4 accidentally strikes the aircraft 2, damage to the aircraft 2 may be discovered at the airport loading gate just prior to a departure. If repair equipment is not available or if the repair may be extensive, the flight might be cancelled. The aircraft may be grounded and taken out of service to be ferried or towed to a maintenance base, with consequent significant economic impact to the aircraft operator.

A repair may be provided that would be temporary or permanent depending on the extent of the damage. These may be non-structural (such as sealing the surface so moisture does not get in) or structural (restoring some level of strength to the area). If the damage is superficial, the aircraft may be simply released for departure without a repair. The extent of the damage may need to be determined even as passengers are waiting at the boarding gate, expecting to depart. Without knowledge of the extent of damage, one cannot determine what level of repair, if any, is needed.

Figure 9A:
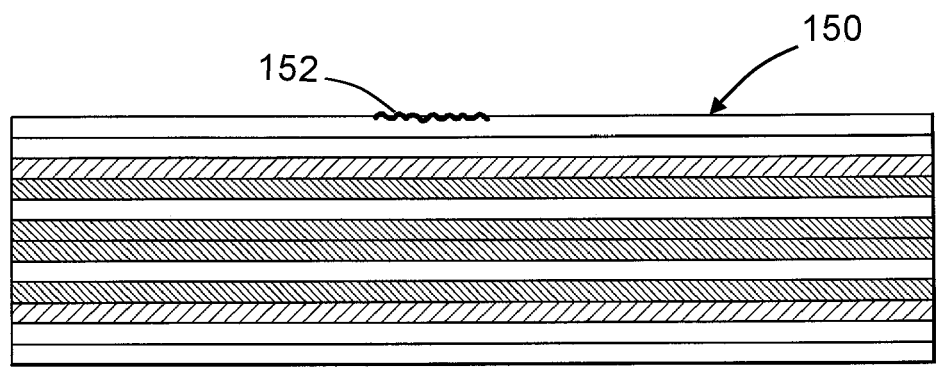
FIGS. 9A-9C are diagrams representing sectional views of a composite laminate having respective exemplary levels of damage.
Figure 9B:
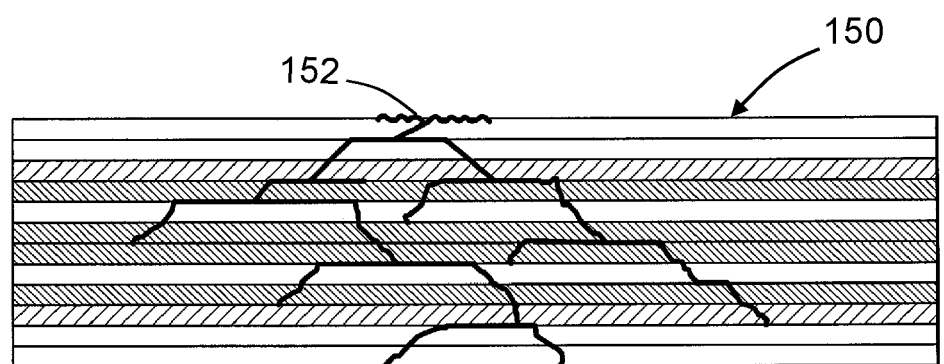
Figure 9C:
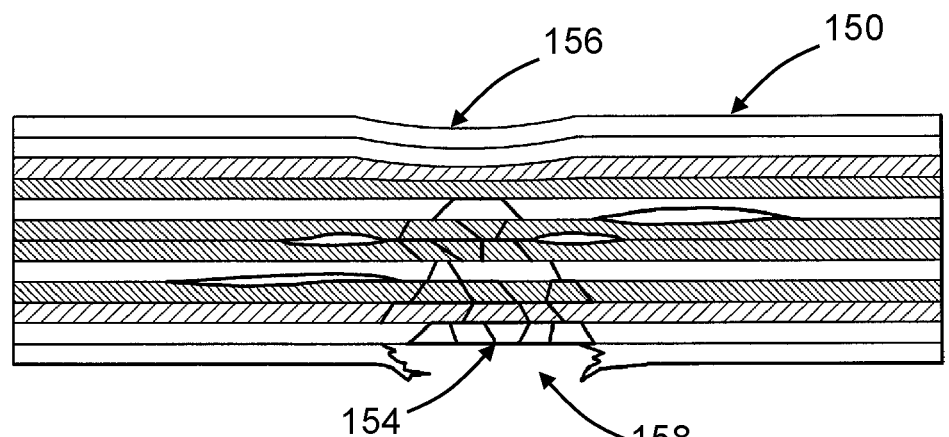

FIGS. 9A-9C are diagrams representing sectional views of a composite laminate 150 having respective exemplary levels of damage. In accordance with the UAV-enabled NDE procedure disclosed herein, the damage may be categorized. For example, the surface damage 152 depicted in FIG. 9A may be categorized as a low-energy impact with slight damage; the surface damage 152 and internal cracking 154 depicted in FIG. 9B may be categorized as a low-energy impact with moderate damage; or the internal cracking 154, surface indentation 156 and delamination 158 depicted in FIG. 9C may be categorized as a medium-energy impact with severe damage. As shown in FIGS. 9A-9C, visual detection may not be an accurate indicator of the degree of damage. Because of the complex structure of composite materials, however, repair methods can be quite involved and are normally undertaken only at appropriate maintenance facilities.

Upon receipt of an impact incident report, an aircraft maintenance operations center dispatches a UAV equipped with a camera and an NDE sensor unit to inspect the fuselage of the aircraft for potential damage. If a discontinuity is found, a picture is taken that is then analyzed to determine if it is damage, and, if so, determine the size of the damage. An impact from hail or a rock kicked up could leave a tell-tale indication of damage. If the size of the damage is smaller than a predetermined threshold for external damage, it would be left as is (e.g., a ¼-inch-diameter slight indentation). If the external damage is larger (visually) than the predetermined threshold for external damage, then the UAV performs an NDE procedure using the NDE sensor unit. The result will determine whether the internal damage is larger than a predetermined threshold for internal damage or not. If the internal damage is not larger than the predetermined threshold for internal damage, a repair (e.g., sealing or simple adhesive patch) can be done with the same or another UAV. If the internal damage is above the predetermined threshold for internal damage (e.g., 1-inch diameter), a remote repair is done, using a special UAV equipped with tools to do, for example, scarfing, patch insertion, vacuum, heat, etc.

Figure 10:
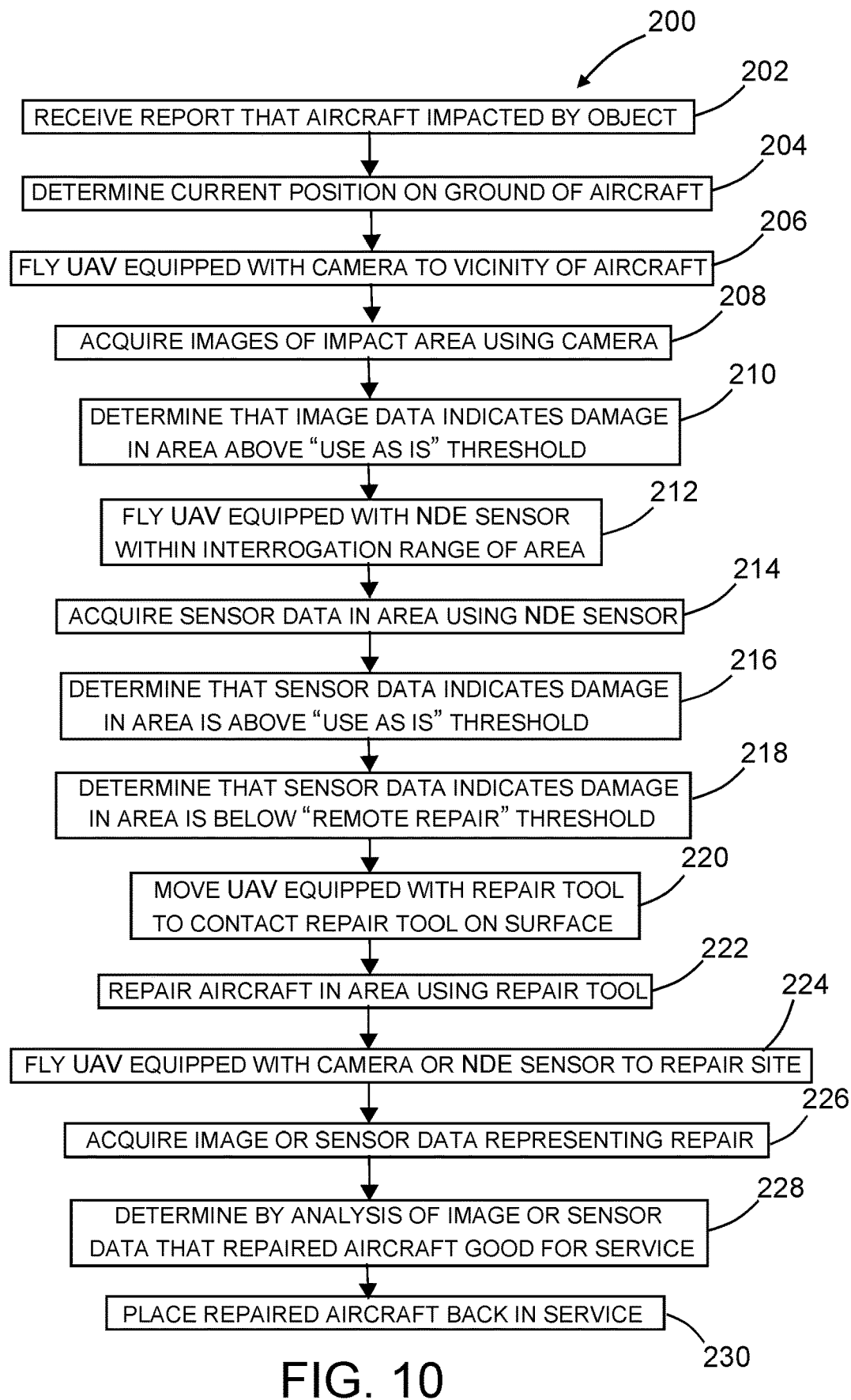
FIG. 10 is a flowchart identifying steps of a method for inspecting and repairing a damaged portion of an aircraft using one or more UAVs in accordance with some embodiments.

FIG. 10 is a flowchart identifying steps of a method 200 for inspecting and repairing a damaged portion of an aircraft using one or more UAVs in accordance with some embodiments. For the purpose of illustration, the assumption is made that the flight crew of an aircraft has detected a possible impact of an object on the aircraft. The overall process is initiated when a maintenance operations center receives a report from the flight crew that the aircraft was impacted by an object (step 202). The maintenance operations center determines the current position of the aircraft on the ground (step 204) and then dispatches a UAV equipped with a camera to perform a visual inspection. The dispatched UAV flies to the vicinity of the possible impact area (hereinafter "area of interest") on the aircraft (step 206). The camera is then used to acquire images of the area of interest as the UAV hovers at a distance from that area of interest (step 208). The computer on-board the camera-equipped UAV then determines that the acquired image data indicates damage in the area of interest above a first "use as is" threshold (step 210).

Following a determination that the damage indication is above the first "use as is" threshold, a UAV equipped with an NDE sensor unit (which may be the same UAV as the camera-equipped UAV or a separate UAV) is flown to a location where the NDE sensor unit is within an measurement range of the area of interest on the surface of the aircraft (step 212). For example, the NDE sensor-equipped UAV may contact the surface of the aircraft and then cease further movement. The NDE sensor unit is then used to acquire NDE sensor data in the area of interest (step 214). The computer on-board the NDE sensor-equipped UAV then determines that the acquired NDE sensor data indicates damage in the area of interest above a second "use as is" threshold (step 216). In addition, the computer on-board the NDE sensor-equipped UAV then determines that the acquired NDE sensor data indicates damage in the area of interest below a "remote repair" threshold (step 218).

Following these determinations, a UAV equipped with a repair tool (which may be the same UAV as the NDE sensor-equipped UAV or a separate UAV) is flown to a location where the repair tool can be placed in contact with the surface of the aircraft in the area where the repair will be made (step 220). The repair tool is then used to repair the damaged portion of the aircraft (step 222) while the repair tool-equipped UAV is stationary.

Following completion of the repair, either the camera-equipped UAV or the NDE sensor-equipped UAV is flown to a location in proximity or contact with the repair site on the aircraft (step 224). (As previously mentioned, all of the UAV-enabled steps may be performed by a single UAV equipped with a camera, an NDE sensor unit and a repair tool.) The UAV then acquires image or sensor data representing structural characteristics of the repaired potion of the aircraft (step 226). The on-board computer then determines by analysis of the image or sensor data that the repaired aircraft is good for service (step 228). Upon receipt of this report, the maintenance operations center sends a message to the flight operations center notifying flight operations personnel that the repaired aircraft may be placed back in service. In response to that notification, the flight operations center places the aircraft back in service (step 230).

The term "structure" as used herein is not limited to aircraft and wind turbines. This disclosure relates to systems and methods that can be used to inspect and repair any number of parts or structures of different shapes and sizes, such as machined forgings, castings, pipes, or composite panels or parts. In addition, an inspected and repaired structure can include various components, such as a substructure for providing additional support to the structure. Further, an inspected and repaired structure may be made of any one of a number of materials. For example, an inspected and repaired structure can include a metallic material, such as aluminum, or a composite material, such as graphite-epoxy. In particular, an inspected and repaired structure can be an aircraft component made of composite material.

While methods for inspecting and repairing a damaged portion of a large structure or object using one or more UAVs have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

As used in the claims, the term "location" comprises position in a three-dimensional coordinate system and orientation relative to that coordinate system.

As used herein, the term "computer system" should be construed broadly to encompass a system having at least one computer or processor, and which may have multiple computers or processors that communicate through a network or bus. As used in the preceding sentence, the terms "computer" and "processor" both refer to devices comprising a processing unit (e.g., a central processing unit) and some form of memory (i.e., computer-readable medium) for storing a program which is readable by the processing unit.

The method claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the method claims be construed to exclude any portions of two or more steps being performed concurrently or alternatingly unless the claim language explicitly states a condition that precludes such an interpretation.

The invention claimed is:

1. An unmanned aerial vehicle comprising: a base; a plurality of rotor motors mounted to the base; a plurality of rotors operatively coupled to respective rotor motors of the plurality of rotor motors; a camera supported by and rotatable relative to the base; an NDE sensor unit supported by the base;
   a subtractive repair tool supported by the base; an additive repair tool supported by the base; and a computer system configured to: determine that NDE sensor data acquired by the NDE sensor unit has a value greater than a first "use as is" threshold and less than a "remote repair threshold"; and activate the subtractive repair tool and the additive repair tool in sequence in response to a determination that the NDE sensor data has a value greater than the first "use as is" threshold and less than the "remote repair threshold".

2. The unmanned aerial vehicle as recited in claim 1, wherein the computer system is further configured to: determine that image data acquired by the camera has a value greater than a second "use as is" threshold; and activate the NDE sensor unit in response to a determination that the image data has a value greater than the second "use as is" threshold.

3. The unmanned aerial vehicle as recited in claim 1, further comprising: a camera turret motor mounted to the base; and a camera turret rotatably coupled to the base, operatively coupled to the camera turret motor and supporting the camera, wherein:
   the camera turret is rotatable between a first angular position and a second angular position; the NDE sensor unit is in a field-of-view of the camera when the camera turret is in the first angular position and is not in the field-of-view of the camera when the camera turret is in the second angular position; and the subtractive repair tool is in the field-of-view of the camera when the camera turret is in the second angular position and is not in the field-of-view of the camera when the camera turret is in the first angular position.

4. The unmanned aerial vehicle as recited in claim 1, wherein the subtractive repair tool comprises:
   a rotary tool motor mounted to the base;

a rotary shaft which is rotatably coupled to the rotary tool motor; and
an abrasive head attached to a distal end of the rotary shaft, and wherein the additive repair tool comprises:
a pump motor mounted to the base;
a pump which is rotatably coupled to the rotary tool motor;
a tube that is in fluid communication with the pump; and
a nozzle attached to a distal end of the tube.

5. The unmanned aerial vehicle as recited in claim 4, further comprising:
a storage canister mounted to the base; and
an electronically controlled valve that is in fluid communication with the storage canister and the pump.

6. The unmanned aerial vehicle as recited in claim 5, wherein the NDE sensor unit comprises:
a sensor array; and
an array controller which is electronically communicatively coupled to the sensor array.

7. The unmanned aerial vehicle as recited in claim 6, wherein:
the base has first through fourth sides;
the sensor array is disposed beyond the first side of the base;
the nozzle is disposed beyond the second side of the base; and
the abrasive head is disposed beyond the third.

8. The unmanned aerial vehicle as recited in claim 7, further comprising:
a camera turret motor mounted to the base; and
a camera turret rotatably coupled to the base, operatively coupled to the camera turret motor, and supporting the camera, wherein:
the camera turret is rotatable between first, second, and third angular positions;
the sensor array is in a field-of-view of the camera when the camera turret is in the first angular position and is not in the field-of-view of the camera when the camera turret is in either of the second and third angular positions;
the nozzle is in the field-of-view of the camera when the camera turret is in the second angular position and is not in the field-of-view of the camera when the camera turret is in either of the first and third angular positions; and
the abrasive head in the field-of-view of the camera when the camera turret is in the third angular position and is not in the field-of-view of the camera when the camera turret is in either of the first and second angular positions.

9. The unmanned aerial vehicle as recited in claim 8, further comprising a plurality of motor controllers which are communicatively coupled to the computer, wherein respective motor controllers of the plurality of motor controllers are communicatively coupled to control operation of the rotor motors, the rotary tool motor, the pump motor, and the camera turret motor.

10. The unmanned aerial vehicle as recited in claim 9, wherein the computer system is configured to command the motor controller that is communicatively coupled to the camera turret motor to rotate the camera to the first angular position and then command the array controller to activate the sensor array while the camera is in the first angular position.

11. The unmanned aerial vehicle as recited in claim 9, wherein the computer system is configured to command the motor controller that is communicatively coupled to the camera turret motor to rotate the camera to the second angular position and then command the motor controller that is communicatively coupled to the pump motor to rotate the pump while the camera is in the second angular position.

12. The unmanned aerial vehicle as recited in claim 9, wherein the computer system is configured to command the motor controller that is communicatively coupled to the camera turret motor to rotate the camera to the third angular position and then command the motor controller that is communicatively coupled to the rotary tool motor to rotate the rotary shaft while the camera is in the third angular position.

13. An unmanned aerial vehicle comprising: a base; a plurality of rotor motors mounted to the base; a plurality of rotors operatively coupled to respective rotor motors of the plurality of rotor motors; a camera supported by and rotatable relative to the base; an NDE sensor unit supported by the base; an additive repair tool supported by the base; and a computer system configured to: determine that NDE sensor data acquired by the NDE sensor unit has a value greater than a "use as is" threshold and less than a "remote repair threshold"; and activate the additive repair tool in response to a determination that the NDE sensor data has a value greater than the "use as is" threshold and less than the "remote repair threshold", wherein the additive repair tool comprises:
a pump motor mounted to the base;
a pump which is rotatably coupled to the pump motor;
a tube that is in fluid communication with the pump; and
a nozzle attached to a distal end of the tube.

14. The unmanned aerial vehicle as recited in claim 13, further comprising:
a storage canister mounted to the base; and
an electronically controlled valve that is in fluid communication with the storage canister and the pump.

15. An unmanned aerial vehicle comprising:
a base;
a plurality of rotor motors mounted to the base;
a plurality of rotors operatively coupled to respective rotor motors of the plurality of rotor motors;
a camera turret motor mounted to the base;
a camera turret rotatably coupled to the base and operatively coupled to the camera turret motor;
a camera mounted to the camera turret;
an NDE sensor unit supported by the base;
a subtractive repair tool supported by the base;
an additive repair tool supported by the base; and
a computer system connected and configured to activate the camera, determine that image data acquired by the camera following activation has a value greater than a first "use as is" threshold; activate the NDE sensor unit in response to a determination that the image data has a value greater than the first "use as is" threshold; determine that the NDE sensor data acquired by the NDE sensor unit following activation has a value greater than a second "use as is" threshold and less than a "remote repair threshold", and activate the subtractive repair tool in response to a determination that the NDE sensor data has a value greater than the second "use as is" threshold and less than the "remote repair threshold".

16. The unmanned aerial vehicle as recited in claim 15, wherein the subtractive repair tool comprises:
a rotary tool motor mounted to the base;
a rotary shaft which is rotatably coupled to the rotary tool motor; and an abrasive head attached to a distal end of the rotary shaft.

17. The unmanned aerial vehicle as recited in claim 16, wherein the additive repair tool comprises:
a pump motor mounted to the base;
a pump which is rotatably coupled to the pump motor;
a tube that is in fluid communication with the pump;
a nozzle attached to a distal end of the tube;
a storage canister mounted to the base; and
an electronically controlled valve that is in fluid communication with the storage canister and the pump.

18. The unmanned aerial vehicle as recited in claim 17, further comprising a plurality of motor controllers which are communicatively coupled to control operation of the rotor motors, the rotary tool motor, the pump motor, and the camera turret motor, wherein the computer system is further configured to command the motor controllers to cause a sequence of repair operations comprising:
controlling the rotor motors to cause the unmanned aerial vehicle to land at a first location on a surface where the abrasive head overlies an anomaly on the surface;
activating the camera turret motor to rotate the camera turret to an angular position where the abrasive head is in a field-of-view of the camera;
activating the rotary tool motor to rotate the rotary shaft to abrade material from the surface;
controlling the rotor motors to cause the unmanned aerial vehicle to lift away from the surface, maneuver, and land at a second location on the surface where the nozzle overlies an area on the surface where the anomaly was abraded;
activating the camera turret motor to rotate the camera turret to an angular position where the nozzle is in a field-of-view of the camera; and
activating the pump motor to apply material on the surface where material was removed.

19. A method of performing an unmanned aerial vehicle-enabled repair using the unmanned aerial vehicle as recited in claim 15, the method comprising:

(a) controlling the rotor motors to cause the unmanned aerial vehicle to land at a first location on a surface where a sensor array of the NDE sensor unit overlies an anomaly on the surface;
(b) activating the NDE sensor unit to acquire sensor data from the anomaly;
(c) determining that the NDE sensor data acquired by the NDE sensor unit following activation has a value greater than a "use as is" threshold and less than a "remote repair threshold";
(d) controlling the rotor motors to cause the unmanned aerial vehicle to lift away from the surface, maneuver, and land at a second location on the surface where a portion of the subtractive repair tool overlies the anomaly;
(e) activating the subtractive repair tool to remove material from the surface;
(f) controlling the rotor motors to cause the unmanned aerial vehicle to lift away from the surface, maneuver, and land at a third location on the surface where a portion of the additive repair tool overlies an area on the surface where the anomaly was abraded; and
(g) activating the additive repair tool to apply material on the surface where material was removed.

20. The method as recited in claim 19., further comprising:
(h) activating the camera turret motor to rotate the camera turret to an angular position where a distal end of the subtractive repair tool is in a field-of-view of the camera, wherein step (h) is performed subsequent to step (d) and prior to step (e); and
(i) activating the camera turret motor to rotate the camera turret to an angular position where a distal end of the additive repair tool is in the field-of-view of the camera, wherein step (i) is performed subsequent to step (g) and prior to step (g).

* * * * *